Dec. 28, 1954   M. E. CHANDLER   2,697,909
FUEL CONTROL FOR TURBOJET ENGINES
Filed April 23, 1946   3 Sheets-Sheet 1

INVENTOR.
MILTON E. CHANDLER
BY
Lester W Clark
AGENT

Dec. 28, 1954         M. E. CHANDLER         2,697,909
              FUEL CONTROL FOR TURBOJET ENGINES
Filed April 23, 1946                    3 Sheets-Sheet 2

INVENTOR

MILTON E. CHANDLER

BY Lester W Clark

AGENT

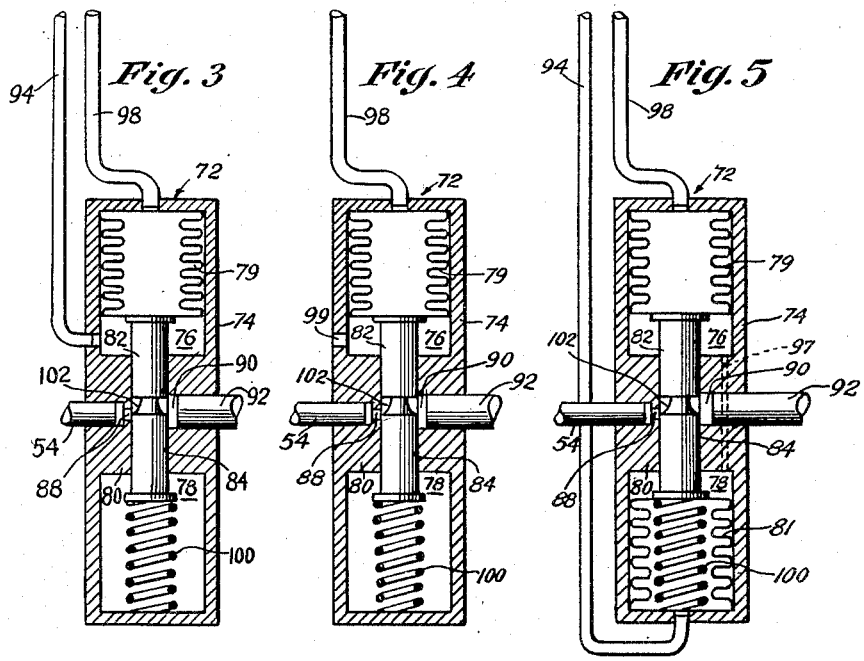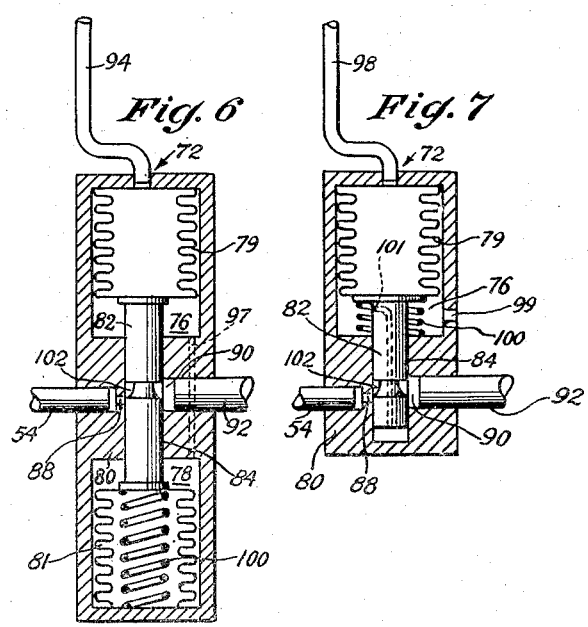

United States Patent Office 2,697,909
Patented Dec. 28, 1954

2,697,909

FUEL CONTROL FOR TURBOJET ENGINES

Milton E. Chandler, New Britain, Conn., assignor, by mesne assignments, to Niles-Bement-Pond Company, West Hartford, Conn., a corporation of New Jersey Application April 23, 1946, Serial No. 664,412

17 Claims. (Cl. 60—39.28)

The present invention applies to fuel control apparatus for internal combustion engines of the combustion gas turbine, or turbo-jet type.

The particular embodiment of my invention described in the appended specification is intended for control of fuel delivered to an internal combustion engine of the turbo-jet type suitable for propeller-propulsion, jet-propulsion, or combined propeller-and-jet propulsion of aircraft. Such engines usually include a compressor, one or more combustion chambers to which fuel is delivered by a pump mechanism, a gas turbine and a discharge tail-pipe, in the order stated.

In order that the efficiency of operation of this type of engine be acceptably high, it is necessary to provide a fuel control of both structural and functional distinction from conventional forms of control employed with reciprocating engines.

In gas-turbine engines, the desired proportionality of total fuel to total air is relatively low and the importance of fuel-to-air ratio is superseded by the significance of speed and temperature control. Structural and metallurgical limitations are such that it is necessary to control fuel flow as a function of engine speed, so that a predetermined maximum speed is never exceeded. Similarly, it is necessary to control fuel flow as a function of temperature, generally that of combustion gases in the tail-pipe, so that a predetermined temperature is never exceeded. It is further desirable in some jet engines to control fuel flow below maximum allowable speed as a function of speed in a manner such that, except for purposes of acceleration, the fuel supplied to the engine is a prescribed amount less than that which would produce the predetermined limiting temperature.

It is therefore an object of the present invention to provide improved control apparatus regulating fuel flow as a function of an air pressure differential in the engine which is an indication of air flow; and to provide improved means limiting fuel flow so that, regardless of air flow, neither engine speed nor temperature may exceed predetermined limiting values.

Another object of this invention is to provide in such control apparatus, improved means rendering fuel flow subject to control of the operator so that engine speed may be regulated to satisfy flight speed requirements.

A further object of my invention is to provide improved fuel control apparatus of simple design and construction.

Other objects and advantages of the present invention will become apparent from a consideration of the appended specification, claims, and drawings, in which:

Figure 1:
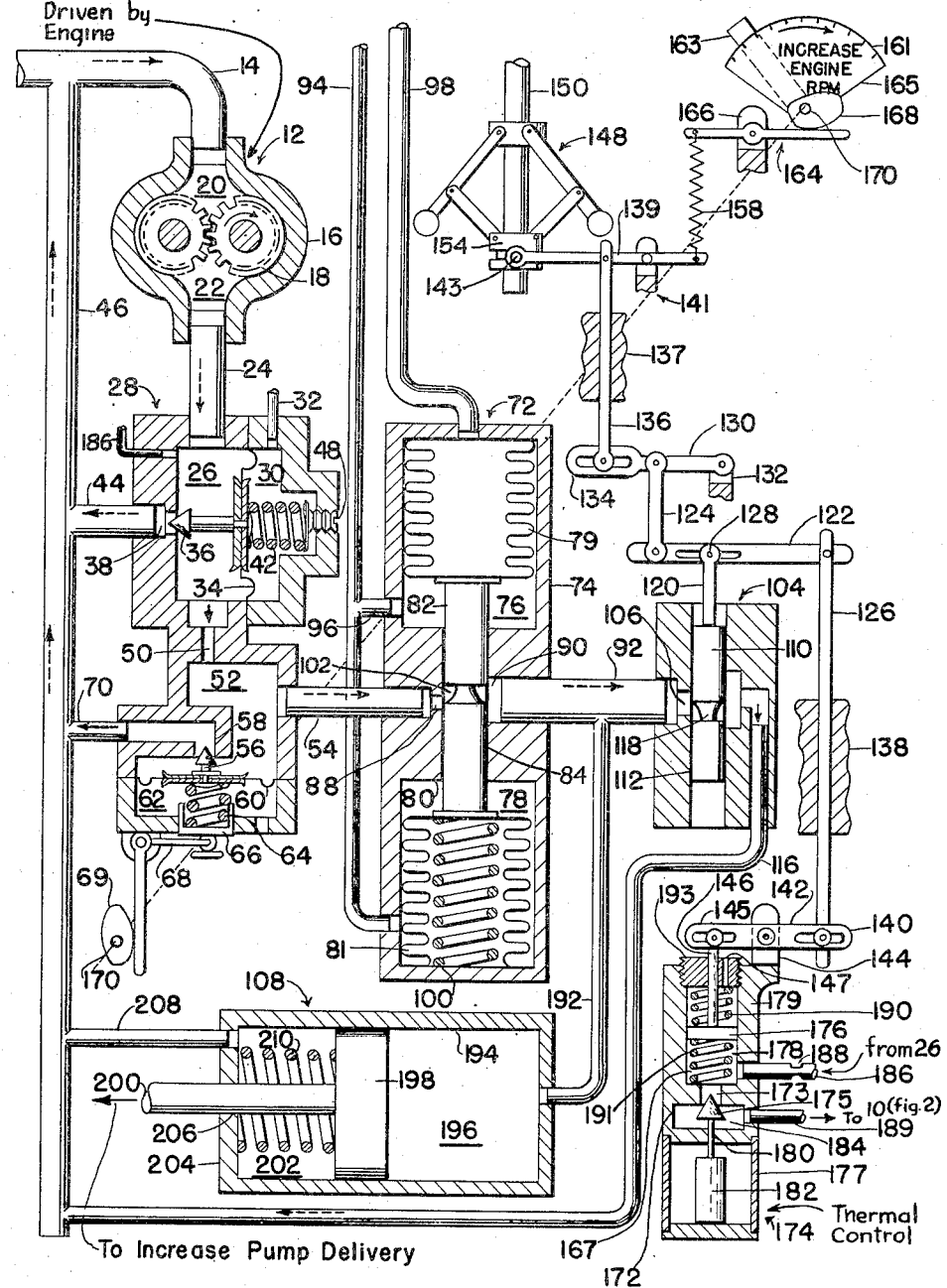
Figure 1 illustrates, somewhat diagrammatically, fuel control apparatus embodying the principles of my invention and its relationship with the engine speed governor and temperature control.

Referring to the drawing, Figure 1, the principal elements of the control apparatus hereinafter described include: an hydraulic fluid reservoir 10 (Figure 2), a pump 12, a pressure regulator 28 including a fixed restriction 50, the differential across which is maintained substantially constant by a regulating valve 36 and a by-pass valve 56, which respectively maintain substantially constant pressures in chambers 26 and 52, upstream and downstream respectively from restriction 50; a manually operable spring support 66, for setting a particular value of constant pressure in chamber 52 and conduit 54, and a connection thereto thru a lever 68, and a cam 69 on a shaft 170, to a speed control lever 163; a control valve mechanism 72 which varies the effective area of a restriction 88 so that the area increases as the compressor discharge pressure in the engine (Figure 2) increases; and a discharge valve mechanism 104 which increases the effective area of a restriction 106 as the exhaust gas temperature or the engine speed exceed predetermined limits respectively determined by a thermal control 174 and an engine speed governor 148, the governor being connected to the speed control lever 163.

There is also a fluid motor 108 responsive to the fluid pressure in a conduit 92 between the control valve 72 and discharge valve mechanism 104. When that pressure, hereinafter referred to as the motor pressure, increases, the motor actuates delivery varying means controlling a fuel pump 210, Figure 2, to increase its delivery. It is to be further explained in the following detailed description of the drawing that, as the compressor discharge pressure increases, the motor pressure increases and fuel flow to the engine increases; and, that as engine speed falls below a value predetermined by the setting of speed control lever 163, in respect to a quadrant 165, the fuel flow increases. The temperature control is generally effective only within a narrow range below a fixed limiting temperature to reduce fuel flow to the engine.

Referring to the drawing in detail, there is shown a reservoir 10 from which motor fluid flows thru an inlet conduit 14 into an inlet chamber 20 in a pump 12. The type pump illustrated consists of two engaged gears 18 rotatable in a housing 16 in a manner which forces fluid carried around the inside of housing 16 into an outlet chamber 22, whence it flows thru an outlet conduit 24 to a chamber 26 in a pressure regulator generally indicated as 28.

In pressure regulator 28, chamber 26 is separated by a diaphragm 34 from another chamber 30, which is vented by means of a tube 32 to atmospheric or other suitable pressure. The pressure in chamber 26 is regulated by a valve 36, connected to diaphragm 34, operating in a valve seat 38 thru which fluid flows from chamber 26 into a regulator discharge channel 44 to a return line 46 connected to inlet conduit 14. A spring 42 biases valve 36 toward closed position and may be adjusted by movement of the adjusting screw 48 so that equilibrium of forces acting on valve 36 occurs at a substantially constant predetermined value of the differential between respective pressures in chambers 26 and 30 which act on diaphragm 34 to produce a force opposite the substantially constant adjusted spring force. In operation, therefore, when the pressure in chamber 30 is constant the absolute pressure in chamber 26 is substantially constant, its value depending on the adjustment of spring 42. When chamber 30 is vented to atmosphere, the gage pressure of fluid in chamber 26 is substantially constant.

Fluid flows from chamber 26 thru a fixed restriction 50 into a chamber 52 whence some of the fluid enters a conduit 54. The pressure in chamber 52 is less than that in chamber 26, but is similarly regulated by a by-pass valve 56 operating in a valve seat 58 and connected to a diaphragm 60, which separates chamber 52 from another chamber 62. Fluid by-passed by valve 56 enters a drain conduit 70 which carries it to the return line 46 and thence to inlet conduit 14.

The force produced by the differential between respective pressures in chambers 52 and 62 acts on diaphragm 60 and tends to open valve 56. A spring 64 supplies an opposite force tending to close the valve so that, when chamber 62 is vented to atmosphere, the gage pressure of fluid in chamber 52 is substantially constant, its particular value depending on the force supplied by spring 64. A support 66 is operable by a lever 68 to vary the deflection of spring 64 which, in turn, varies the spring load and the pressure in chamber 52. The lever 68 is operable by a cam 69 fixed to a shaft 170 which in turn is operable by a speed control lever 163. As subsequently explained, lever 163 may be set by the engine operator in any desired position as indicated by a calibrated speed control quadrant 165.

The adjustment of spring 64 and the pressure in chamber 52 are therefore substantially constant except while the operator is changing a speed setting at quadrant 165. It is apparent, therefore, that the pressure of fluid flowing into conduit 54 is substantially a constant, the value of which is subject to change by manual control of lever 63, and that pressure regulator 28 serves the dual purpose of regulating the respective pressures on both the upstream and downstream sides of the fixed restriction 50.

As shown, fluid pump 12 may be driven by the engine and is of sufficient capacity to provide high pressure at low starting speeds. Valve 36 compensates for considerable variation in pressure of fluid discharged by the pump, while valve 56 operates in a smaller range of pressures and is therefore considerably smaller. The pressure in chamber 52 is regulated within closer limits than that in chamber 26, but the differential is small enough to permit use of a fixed restriction 50 of adequate size to avoid obstruction in service. The arrangement shown is well adapted to an installation in which the fluid pump is remotely located in respect to the rest of the fuel control, in which case a single valve serving the combined purposes of valves 56 and 36 necessitates an unsatisfactory long and complicated valve control mechanism.

Figure 2:
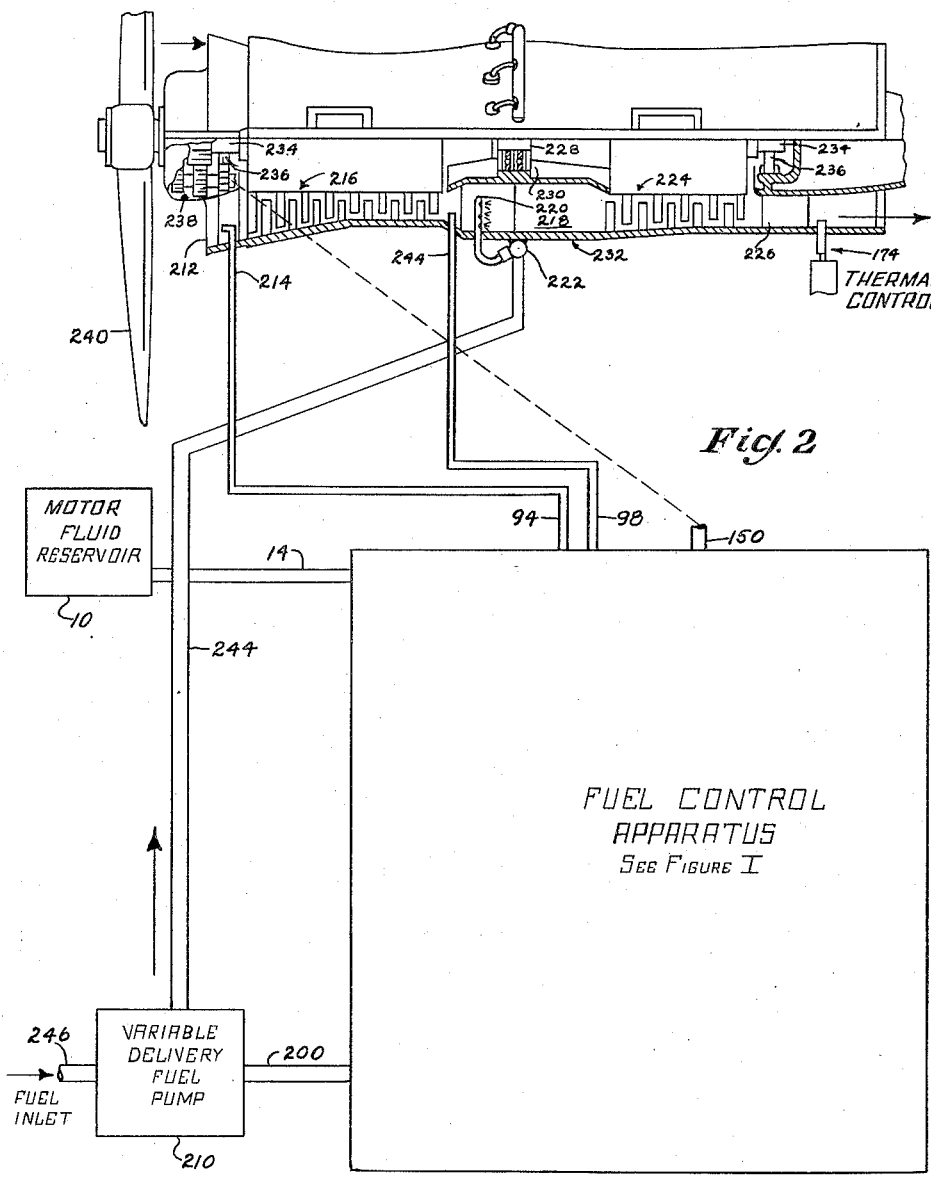
Figure 2 shows, diagrammatically, an internal combustion, turbo-jet engine for propeller-and-jet propulsion of aircraft and the principal connecting elements between the engine and the control of Figure 1, and Figures 3 to 7, inclusive, show alternate arrangements of the control valve mechanism (72) of Figure 1.

From conduit 54, fluid enters a control valve mechanism generally indicated as 72, comprising a housing 74 having a chamber 76 at one end and another chamber 78 at the other end which are separated by an approximately centrally located wall 80. A bellows 79 and a bellows 81, respectively, are mounted in chambers 76 and 78, both bellows being anchored at their outer ends to housing 74, and being connected to each other by a valve 82. The valve 82 operates in a guide 84 in wall 80. A path for flowing fluid is provided from conduit 54 thru a restriction 88, past valve 82 to a channel 90 from which it enters a tube 92. The spaces outside bellows 79 and 81, in chambers 76 and 78 respectively, are vented by a conduit 94, which enters chamber 78 and which is connected to a conduit 96 entering chamber 76, to the impact pressure of air entering the engine by conduit 214, as shown in Figure 2. As long as chambers 76 and 78 are vented to the same pressure, the pressure outside bellows 79 and 81 is immaterial, since its effect on one bellows is compensated by an equal and opposite effect on the other.

The interior of bellows 79 is connected by conduits 98 and 244 to the compressor discharge pressure in the engine, and bellows 81 is sealed after evacuation. Valve 82 is therefore subjected to a net force proportional to absolute compressor discharge pressure which tends to move it downward. While the embodiment of my invention shown in Figure 1 and described herein specifies use of a pair of bellows 79 and 81 in control valve mechanism 72, the bellows being responsive to the absolute compressor discharge pressure, alternate bellows and pressure applications include use of any one of the following arrangements: (1) a single bellows 79 connected to the compressor discharge chamber, and chamber 76 connected to engine air inlet 212 (Fig. 3), wherein valve 82 is controlled by the air pressure differential across the compressor 216 (compressor rise); (2) a single bellows 79 connected to the compressor discharge chamber, and chamber 76 vented to atmosphere (Fig. 4), wherein valve 82 is controlled by the compressor discharge gage pressure; (3) bellows 79 is connected to the compressor discharge chamber, and bellows 81 connected to engine air inlet 212 (Fig. 5), wherein valve 82 is controlled by compressor rise as in Fig. 3, but with the use of two bellows instead of one; (4) bellows 79 is connected to air inlet 212, and bellows 81 is evacuated and sealed (Fig. 6), wherein the valve 82 is controlled by absolute air inlet (impact) pressure; and (5) bellows 79 is connected to the compressor discharge chamber, and the chamber 76 is vented to atmosphere (Fig. 7), wherein valve 82 is controlled by compressor discharge gage (impact) pressure. The spring rates of bellows 79 and 81 tend to position the valve so that deflection of both bellows is the same. Except in Figure 6, a spring 100 is employed in opposition to the compressor discharge pressure to permit establishing the valve 82 in a definite positioned relationship with guide 84 for all values of compressor discharge pressure differential, the initial spring deflection determining the valve position for an initial value of pressure differential and the spring rate determining valve positions assumed at other pressure differential values. An undercut 102, which may be contoured as desired, is effective to vary the area of restriction 88 from a minimum value when the compressor discharge pressure is minimum, to a maximum value when that pressure is maximum. Thus the effective area of restriction 88 increases as the compressor discharge pressure increases.

The compressor discharge pressure is a function of compressor characteristics and other factors which include entering air density and pressure, and engine speed. The contour of undercut portion 102 of valve 82 is therefore determined by empirical engine requirements corresponding to various conditions of compressor discharge pressure. Valve 82 and orifice 88 are made co-functional to produce desired changes in effective orifice area over the full range of compressor discharge pressure change.

Except during acceleration and deceleration, when the engine requires respectively increasing and decreasing fuel supply, all fluid entering conduit 92 is delivered to a discharge valve mechanism generally indicated as 104, through which the path of flow includes a restriction 106 and a discharge valve 110, whence the fluid flows into a discharge conduit 116 which carries it to return line 46 and to inlet conduit 14. An undercut 118 on discharge valve 110, which may be irregular in shape, varies the effective area of restriction 106 from maximum to minimum values, respectively, as valve 110 moves from an extreme upward to an extreme downward position. Valve 110 moves in a guide 112. A rod 120 attached to valve 110 has a pin-and-slot connection 123 with a cross arm 122, the left and right ends of which are connected to ends of links 124 and 126, respectively. Link 124 is connected to a lever 130, one end of which has a swivel connection with a fixed bearing 132, the other end of lever 130 having a pin-and-slot connection 134 with a rod 136 in a guide 137, so that downward movement of rod 136 moves valve 110 downward and decreases the effective area of restriction 106.

The upper end of rod 136 is hinged to a lever 139 which is pivoted in a fixed support 141 at a point to the right of the hinge. The left end of lever 139 is provided with a pin 143 having engagement with a grooved sleeve 154 included in a speed governor generally indicated in simple form as 148. The governor is operated by a shaft 150 which is driven by the engine at a speed proportional to engine speed and movement of slidable sleeve 154 is transmitted to rod 136. As engine speed increases, rod 136 moves upward, and the effective area of restriction 106 increases. The governor 148 is rendered ineffective below any selected value of engine speed by provision of a spring 158 which opposes upward movement of slidable sleeve 154. Variable adjustment of the governor speed at which the spring load is overcome and the sleeve 154 begins to rise is accomplished by attaching one end of spring 158 to the right end of lever 139 and the other to the end of a lever 164 which is hinged at an intermediate point to a fixed bearing 166, and has its right end positioned by a cam 168 fixed to the rotatable shaft 170.

Link 126 operates in a guide 138 and has a pin-and-slot connection 140 at its lower end with the end of a lever 142 which is hinged to a fixed support 144 at an intermediate point in its length. The other end of lever 142 has a pin-and-slot connection 145 with a rod 146, so that downward movement of rod 146 moves valve 110 upward and increases the effective area of restriction 106. The rod 146 is controlled by a temperature responsive device generally indicated at 174, comprising: a piston 176 operating in a cylinder 178, in a body 179, one end of the cylinder having therein an adjustable support 193 providing passage for rod 146 and a vent 147 to atmosphere. The other end of the cylinder is closed by a fixed wall 172 which has a centrally located seat 173 in which operates a valve 175. Valve 175 is carried by a rod 182 whose opposite end is fixed to the closed lower end of a tube 177, the upper end of which is fixed onto body 179. The lower end of body 179 is apertured at 180 to permit the passage of the stem of valve 175 therethru. The rod 182 and tube 177 are made of materials having substantially different coefficients of thermal expansion, so that upon an increase in temperature adjacent tube 177, it expands faster than rod 182, thereby opening valve 175. A conduit 186 from a source of motor fluid of constant pressure, which may be chamber 26 in regulator 28, delivers fluid thru a restriction 188 to a chamber 167 whence it flows past valve 175 into chamber 184, and thence thru a conduit 189 to a region of constant lower pressure, which may be reservoir 10. In operation, tube 177 is placed in the tail-pipe, or other location to the temperature of which the fuel control apparatus must respond, and as its temperature increases the relative elongations of tube 177 and valve 175 are such that valve 175 moves downward from seat 173, thereby increasing the area of flow past the valve and decreasing the pressure in chamber 167, which allows an upper spring 190 to force piston 176 downward in opposition to a lower spring 191 and the upward pressure force until a new position of equilibrium is obtained. Thus the temperature control 174 is always effective to govern piston 176 so that as the engine temperature increases above a value determined by the respective loads on springs 190 and 191, rod 146 moves in a downward direction, thereby actuating the linkage system and opening restriction 106. The support 193 is threaded into body 179 and provides means of adjustment so that control of the fuel flow by the temperature responsive device 174 begins when the temperature exceeds a predetermined value, which is generally approximately equal to the maximum allowable temperature.

Movements of rods 136 and 146 do not produce entirely independent movements of valve 110 and the relative effectiveness of movement of rods 136 and 146, thruout a range of positions of each, is partially controlled by proper specification of rod, link, and lever lengths so that valve 110 is correctly responsive to engine control elements used to move rods 136 and 146.

A conduit 192 connects conduit 92 to a fluid motor 108 which includes a cylinder 194 having a chamber 196 containing fluid supplied by conduit 192 and being separated from another chamber 202 by a piston 198. A piston rod 200 extends thru chamber 202 and operates in a sealed bearing 206 centrally located in a wall 204 which closes one end of cylinder 194 and which is provided with a channel 208 thru which fluid is introduced into chamber 202 from return line 46 and inlet conduit 14 from reservoir 10. Piston rod 200 is connected to a means for varying the delivery of a fuel pump, Figure 2, whereby pump delivery increases as a result of outward movement of the piston rod or an increase in pressure in chamber 196. The piston is subjected to forces due to the differential between the motor pressure in chamber 196 and the pressure in reservoir 10 acting on the piston, and an opposite force provided by a spring 210. The pressure in chamber 202 may be considered as substantially constant. As the pressure in chamber 196 increases, it moves piston 198 to the left until the increased pressure force is balanced by an increased spring force due to compression of spring 210. The position of piston 198 and hence the fuel delivered to the engine is therefore controlled by the pressure in chamber 196. This is in turn controlled by manual control 163 (thru valve 56), the compressor discharge pressure (thru valve 82) and the engine speed and tail-pipe temperature (thru valve 110).

It is thus apparent that, as the motor pressure in conduit 92 increases or decreases, fuel pump delivery is correspondingly increased or decreased, there being a definite relationship between motor pressure and pump delivery at all values of fuel flow to the engine. It is further apparent that for a constant position of lever 68, a constant fluid pressure is applied on the upstream side of restriction 88, and that the motor pressure or pressure between restrictions 88 and 106 is subject to control of the respective areas of variable restrictions 88 and 106, whereby an increase in the effective area of restriction 88 increases the motor pressure and an increase in the effective area of restriction 106 decreases the motor pressure.

Since the effective area of restriction 88 increases as the compressor discharge pressure increases, it follows that fuel pump delivery increases as the compressor discharge pressure increases. Similarly, since the effective area of restriction 106 increases either as engine speed or tail-pipe temperature exceeds a predetermined value, fuel pump delivery decreases as such predetermined speed and temperature values are exceeded.

Simultaneous manual control of the speed governor 148 by operation of cam 168 and control of the fluid pressure in chamber 52 by operation of cam 69 is provided so that, except during acceleration, the fuel flow available at any speed is always a preselected amount less than the flow required to produce the limiting tail-pipe temperature at that speed.

In Figure 2 of the drawing there is shown diagrammatically an internal combustion, turbo-jet engine for propeller-and-jet propulsion of aircraft together with connections to the fuel control apparatus of Fig. 1. As shown, principal elements of the engine include an air inlet 212, a tube 214 for measuring total or impact pressure of entering air, a multi-stage air compressor generally indicated at 216, a combustion chamber 218 supplied with fuel discharged from a series of nozzles 220 having conections with a generally circular fuel manifold 222, a multi-stage gas turbine generally indicated at 224 and a tail-pipe 226 from which combustion exhaust gases flow past the thermal control 174 shown in greater detail in Figure 1. The compressor 216 and turbine 224 are rotatable together with an intermediate shaft 228 operating in a bearing 230 supported by the engine casing 232. Similarly there are two shafts 234 supported in bearings 236, one each at the outer ends of the compressor 216 and turbine 224. A system of reduction gears 238 is employed to drive a propeller 240 which is eliminated when the engine is used solely for jet propulsion, in which case the turbine is used only to operate the compressor and may be appreciably reduced in size. As shown in Figure 2, the speed governor shaft 150 of Figure 1 is connected to the gear system 238. Similarly, conduits 94 and 98, of Figure 1, are respectively connected to the impact pressure tube 214 and a compressor discharge pressure tube 244 at the engine. The fuel manifold 222 is connected by a fuel line 244 to a variable capacity fuel pump 210, connected to a source of fuel not shown, by means of a conduit 246, and having a connection with the motor piston rod 200 of Figure 1.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. Fuel control apparatus for a turbo-jet engine, having a compressor associated therewith for delivering combustion air thereto, and a variable delivery fuel pump for delivering fuel thereto; comprising: a source of motor fluid at a substantially constant superatmospheric pressure, a conduit for the flow of said fluid from said source, a first restriction in said conduit; a first outlet from said conduit, a metering orifice therein, means for flow therefrom into a reservoir of said motor fluid at a pressure less than said super-atmospheric pressure, and means for varying the area of said metering orifice to regulate the pressure in said conduit on the downstream side of said first restriction; a second outlet in parallel with said first outlet to a second restriction and means for varying the area of said second restriction responsive to an air pressure differential established across said compressor; a passage from said second restriction to a third restriction, whence said motor fluid flows to said reservoir; a fluid motor and a channel connecting said passage thereto, said motor being connected to said pump so as to vary the rate of delivery of said fuel pump and said second restriction being effective to control the pressure of said fluid in said passage as a function of said compressor pressure differential, whereby said fuel pump delivery varies as a function of said compressor pressure differential and the area of said variable metering orifice.

2. Fuel control apparatus for a turbo-jet engine, having a compressor associated therewith for delivering combustion air thereto, and a variable delivery fuel pump for delivering fuel thereto; comprising: a source of motor fluid at a substantially constant super-atmospheric pressure, a conduit for the flow of said fluid from said source, a first restriction in said conduit; a first outlet from said conduit, a metering orifice therein, means for flow therefrom into a reservoir of said motor fluid at a pressure less than said super-atmospheric pressure, means for varying the area of said metering orifice to regulate the pressure in said conduit on the downstream side of said first restriction at a substantially constant value, and means for setting said area varying means to determine the particular value of substantially constant pressure maintained thereby; a second outlet in parallel with said first outlet to a second restriction and means for varying the area of said second restriction responsive to an air pressure differential established across said compressor; a passage from said second restriction to a third restriction when said motor fluid flows to said reservoir; a fluid motor and a channel connecting said passage thereto, said motor being connected to said pump so as to vary the rate of delivery of said fuel pump and said second restriction being effective to control the pressure of said fluid in said passage as a function of said compressor pressure differential, whereby said fuel pump delivery varies as a function of said compressor pressure differential and the pressure on the downstream side of said first restriction.

3. Fuel control apparatus for a turbo-jet engine, having a compressor associated therewith for delivering combustion air thereto, and a variable delivery fuel pump for delivering fuel thereto; comprising: a source of motor fluid at a substantially constant super-atmospheric pressure, a conduit for the flow of said fluid from said source, a first restriction in said conduit; a first outlet from said conduit, a metering orifice therein, means for flow therefrom into a reservoir of said motor fluid at a pressure less than said super-atmospheric pressure, means for varying the area of said metering orifice to regulate the pressure in said conduit on the downstream side of said first restriction at a substantially constant value, and means for setting said area varying means to determine the particular value of substantially constant pressure maintained thereby; a second outlet in parallel with said first outlet to a second restriction and means for varying the area of said second restriction responsive to an air pressure differential established across said compressor; a passage from said second restriction to a third restriction whence said motor fluid flows to said reservoir, and means for varying the area of said third restriction; a fluid motor and a channel connecting said passage thereto, said motor being connected to said pump so as to vary the rate of delivery of said fuel pump and said second restriction being effective to control the pressure of said fluid in said passage as a function of said compressor pressure differential, whereby said fuel pump delivery varies as a function of said compressor pressure differential, the respective areas of said variable second and third restrictions, and the pressure on the downstream side of said first restriction.

4. Fuel control apparatus for a turbo-jet engine, having a compressor associated therewith for delivering combustion air thereto, and a variable delivery fuel pump for delivering fuel thereto; comprising: a source of motor fluid at a substantially constant super-atmospheric pressure, a conduit for the flow of said fluid from said source, a first restriction in said conduit; a first outlet from said conduit, a metering orifice therein, means for flow therefrom into a reservoir of said motor fluid at a pressure less than said super-atmospheric pressure, means for varying the area of said metering orifice to regulate the pressure in said conduit on the downstream side of said first restriction at a substantially constant value, and means for setting said area varying means to determine the particular value of pressure maintained thereby; a second outlet in parallel with said first outlet to a second restriction and means varying the area of said second restriction responsive to an air pressure differential established across said compressor; a passage from said second restriction to a third restriction whence said motor fluid flows to said reservoir, and means for varying the area of said third restriction responsive to changes in the speed of said engine; a fluid motor and a channel connecting said passage thereto, said motor being connected to said pump so as to vary the rate of delivery of said fuel pump and said second and third restrictions being effective to control the pressure of said fluid flowing therebetween as a function of said compressor pressure differential and said engine speed, whereby said fuel pump delivery varies as a function of said compressor pressure differential, the engine speed, and the pressure on the downstream side of said first restriction.

5. Fuel control apparatus for a turbo-jet engine, having a compressor associated therewith for delivering combustion air thereto, and a variable delivery fuel pump for delivering fuel thereto; comprising: a source of motor fluid at a substantially constant super-atmospheric pressure, a conduit for the flow of said fluid from said source, a first restriction in said conduit; a first outlet from said conduit, a metering orifice therein, means for flow therefrom into a reservoir of said motor fluid at a pressure less than said super-atmospheric pressure, means for varying the area of said metering orifice to regulate the pressure in said conduit on the downstream side of said first restriction at a substantially constant value, and means for setting said area varying means to determine the particular value of pressure maintained thereby; a second outlet in parallel with said first outlet to a second restriction and means varying the area of said second restriction responsive to an air pressure differential established across said compressor; a passage from said second restriction to a third restriction whence said motor fluid flows to said reservoir, and means for varying the area of said third restriction responsive to changes in the temperature of exhaust gases flowing thru said engine; a fluid motor and a channel connecting said passage thereto, said motor being connected to said pump so as to vary the rate of delivery of said fuel pump and said second and third restrictions being effective to control the pressure of said fluid flowing therebetween as a function of said compressor pressure differential and said exhaust gas temperature, whereby said fuel pump delivery varies as a function of said compressor pressure differential, the temperature of exhaust gases flowing thru the engine, and the pressure on the downstream side of said first restriction.

6. Fuel control apparatus for a turbo-jet engine, having a compressor associated therewith for delivering combustion air thereto, and a variable delivery fuel pump for delivering fuel thereto; comprising: a source of motor fluid at a substantially constant super-atmospheric pressure, a conduit for the flow of said fluid from said source, a first restriction in said conduit; a first outlet from said conduit, a metering orifice therein, means for flow therefrom into a reservoir of said motor fluid at a pressure less than said super-atmospheric pressure, means for varying the area of said metering orifice to regulate the pressure in said conduit on the downstream side of said first restriction at a substantially constant value, and means for setting said area varying means to determine the particular value of pressure maintained thereby; a second outlet in parallel with said first outlet to a second restriction and means varying the area of said second restriction responsive to an air pressure differential established across said compressor; a passage from said second restriction to a third restriction whence said motor fluid flows to said reservoir, and means for varying the area of said third restriction responsive to changes in the speed of said engine and in the temperature of exhaust gases flowing thru said engine; a fluid motor and a channel connecting said passage thereto, said motor being connected to said pump so as to vary the rate of delivery of said fuel pump and said second and third restrictions being effective to control the pressure of said fluid flowing therebetween as a function of said compressor pressure differential and said exhaust gas temperature, whereby said fuel pump delivery varies as a function of said compressor pressure differential, the speed of the engine and the temperature of exhaust gases flowing therethru, and the pressure on the upstream side of said second restriction.

7. Fuel control apparatus for a turbo-jet engine having a compressor and a variable delivery fuel pump associated therewith for delivering combustion air and fuel thereto, comprising: a source of motor fluid, a fluid pump connected to said source, a first conduit for the flow of fluid from said pump; a first restriction in said conduit and means regulating fluid pressure on the upstream side of said first restriction at a substantially constant super-atmospheric value; a first outlet from said conduit on the downstream side of said first restriction, a metering orifice in said outlet, a second conduit for flow of fluid from said orifice to said source, means for varying the area of said metering orifice to regulate the pressure downstream from said first restriction at a substantially constant value, and means for setting said area varying means to determine the particular value of pressure maintained thereby; a second outlet from said first conduit to a variable area second restriction and means responsive to an air pressure in said engine for varying the area of said second restriction, a passage from said second restriction to a variable area third restriction, and a return line from said third restriction to said fluid source; a fluid motor and a channel connecting said passage thereto, said motor being connected to said fuel pump and adapted to vary the rate of delivery of said fuel pump responsive to the pressure in said passage, and said second and third restrictions being effective to control the pressure therebetween in said passage, as a function of the respective areas of said second and third restrictions, and said pressure downstream from said first restriction.

8. A fluid control system for a turbo-jet engine comprising a source of motor fluid, a fluid motor, a conduit therebetween, a variable area restriction in said conduit, a control valve effective to vary the area of said restriction, means including a bellows responsive to an air pressure differential in said engine, and a connection between said control valve and said bellows, whereby said control valve is responsive to said pressure differential, a spring biasing said valve in opposition to said pressure differential; a channel for flow of fluid from said motor, another variable area restriction therein, a discharge valve in said channel whence fluid flows to said source, said discharge valve effective to vary the area of said other restriction, whereby the pressure of fluid delivered to said motor is a function of the respective areas of said restrictions, means responsive to the speed of the engine, other means responsive to the exhaust gas temperature of the engine, a connection between both said responsive means and said discharge valve, whence said motor is responsive to said pressure differential and said speed and temperature.

9. Fuel control apparatus for a turbo-jet engine, having a compressor associated therewith for delivering combustion air thereto, and a fuel pump for delivering fuel thereto, comprising: a source of motor fluid at a substantially constant super-atmospheric pressure, a conduit for the flow of said fluid from said source, a first restriction in said conduit, a pair of parallel outlets leading from the discharge side of said first restriction to a reservoir of said motor fluid at a pressure less than said super-atmospheric pressure; a variable area first orifice in one of said outlets and means for varying the area of said first orifice to regulate the pressure downstream from said first restriction; a variable area second and a third orifice connected in series in the other of said outlets, means for varying the area of said second orifice responsive to an air pressure differential in said engine, and fluid motor means responsive to the pressure in said second outlet between said second and third orifices for varying the rate of delivery of said fuel pump.

10. Fuel control apparatus for a turbo-jet engine, having a compressor associated therewith for delivering combustion air thereto, and a fuel pump for delivering fuel thereto; comprising: a source of motor fluid at a substantially constant super-atmospheric pressure, a conduit for the flow of said fluid from said source, a first restriction in said conduit, a pair of parallel passages leading from the discharge side of said first restriction to a reservoir of said motor fluid at a pressure less than said super-atmospheric pressure; a variable area first orifice in one of said passages, variable area second and third orifices connected in series in the other of said passages, fluid motor means, responsive to a pressure in said other passage which is regulated by the flow thru all said orifices, for varying the rate of delivery of said pump in accordance with said regulated pressure, means for varying the area of said first orifice to maintain a substantially constant pressure upstream thereof, means for varying the area of said second orifice in accordance with an air pressure differential in said engine, means for varying the area of said third orifice in accordance with the speed of said engine, and means for varying the area of one of said orifices in accordance with the exhaust gas temperature in said engine.

11. Fuel control apparatus for a turbo-jet engine, having a compressor associated therewith for delivering combustion air thereto, and a fuel pump for delivering fuel thereto; comprising: a source of motor fluid at a substantially constant super-atmospheric pressure, a conduit for the flow of said fluid from said source, a first restriction in said conduit, a pair of parallel passages leading from the discharge side of said first restriction to a reservoir of said motor fluid at a pressure less than said super-atmospheric pressure; means regulating the pressure downstream from said first restriction at a substantially constant value, said means including a first orifice for flowing fluid to said fluid source, a valve operating in said first orifice, a diaphragm supporting said valve and subjected to said downstream pressure whereby said diaphragm tends to open said valve, and a spring biasing said valve to closed position; variable area second and third orifices connected in series in the other of said passages, means for varying the area of said second orifice responsive to an air pressure differential in said engine, and fluid motor means responsive to the pressure in said second passage between said second and third orifices for varying the rate of delivery of said fuel pump.

12. Fuel control apparatus for a turbo-jet engine, having a compressor and a fuel pump associated therewith for delivering combustion air and fuel respectively thereto, and having a speed governor mechanism and manual means for adjustment thereof, comprising: a source of motor fluid at super-atmospheric pressure, a conduit for the flow of said fluid from said source, and a first restriction therein; means regulating the pressure downstream from said first restriction at a substantially constant value and lever means controlling said pressure regulating means to select said value; a passage in parallel with said regulating means, variable area second and third restrictions connected in series in said passage, means for varying the area of one of said second and third restrictions responsive to an air pressure differential in said engine, means for varying the area of the other of said second and third restrictions responsive to said speed governor, a connection between said manual governor adjusting means and said lever means to establish a predetermined relationship between said selected pressure value and the adjustment of said governor, and fluid motor means responsive to the pressure in said second passage between said second and third restrictions for varying the rate of delivery of said fuel pump, whereby the fuel flow varies as a function of said air pressure differential, said engine speed, and said pressure downstream from said first restriction.

13. Fuel control apparatus for a turbo-jet engine, having associated therewith a fuel line and a compressor respectively, for delivering fuel and combustion air thereto, comprising: a source of fuel at super-atmospheric pressure, a conduit from said source to said fuel line for the flow of fuel therebetween, means including a fluid motor for regulating said fuel flow responsive to an air pressure differential at least one component of which is a pressure in said engine, said regulating means including a passage for the flow of motor fluid having three restrictions in series therein at least two of which are variable means for varying the area of each of said variable restrictions, and a connection between said motor and the portion of said passage between said variable restrictions, whereby the fuel flow is a function of said air pressure differential.

14. Fuel control apparatus for a turbo-jet engine, having associated therewith a fuel line and a compressor respectively, for delivering fuel and combustion air thereto, comprising: a source of fuel at super-atmospheric pressure, a conduit from said source to said fuel line for the flow of fuel therebetween, means including a fluid motor for regulating said fuel flow responsive to an air pressure differential at least one component of which is a pressure in said engine, said regulating means including a passage for the flow of motor fluid having a fixed restriction and two variable restrictions successively in series therein, a connection between said motor and the portion of said passage between said variable restrictions, and means for controlling the area of one of said variable restrictions as a function of the engine speed, whereby the fuel flow is a function of said air pressure differential and said engine speed.

15. Fuel control apparatus for a turbo-jet engine, having associated therewith a fuel line and a compressor respectively for delivering fuel and combustion air thereto, comprising: a source of fuel at super-atmospheric pressure, a conduit from said source to said fuel line for the flow of fuel therebetween, means including a fluid motor for regulating said fuel flow responsive to an air pressure differential at least one component of which is a pressure in said engine, said regulating means including a passage for the flow of motor fluid having a fixed restriction and two variable restrictions successively in series therein, a connection between said motor and the portion of said passage between said variable restrictions, and means for controlling the area of one of said variable restrictions as a function of the temperature of exhaust gases in said engine, whereby the fuel flow is a function of said air pressure differential and said temperature.

16. Fuel control apparatus for a turbo-jet engine, having associated therewith a fuel line and a compressor respectively, for delivering fuel and combustion air thereto, comprising: a source of fuel at super-atmospheric pressure, a conduit from said source to said fuel line for the flow of fuel therebetween, means including a fluid motor for regulating said fuel flow responsive to an air pressure differential at least one component of which is a pressure in said engine, said regulating means including a passage for the flow of motor fluid having a fixed restriction and two variable restrictions successively in series therein, a connection between said motor and the portions of said passage between said variable restrictions, and means for controlling the area of one of said variable restrictions as a function of the speed of said engine and the temperature of exhaust gases therein, whereby the fuel flow is a function of said air pressure differential, said engine speed, and said temperature.

17. Fuel control apparatus for a turbo-jet engine, having associated therewith a fuel line and a compressor respectively, for delivering fuel and combustion air thereto, comprising: a source of fuel at super-atmospheric pressure, a conduit from said source to said fuel line for the flow of fuel therebetween, means, including a fluid motor, for regulating said fuel flow responsive to an air pressure differential at least one component of which is a pressure in said engine, said regulating means including a passage for the flow of motor fluid having three restrictions in series therein at least two of which are variable and one is fixed, means for controlling the fluid flow through each of said restrictions, manually-operated means for predetermining the value of the fluid pressure upstream from said fixed restriction, and a connection between said motor and the portion of said conduit between said variable restrictions, whereby the fuel flow is a function of said air pressure differential and said predetermined value of fluid pressure upstream from said fixed restriction.

References Cited in the file of this patent

UNITED STATES PATENTS

| Number | Name | Date |
|---|---|---|
| 1,510,688 | La Fon | Oct. 7, 1924 |
| 1,655,683 | Standerwick | Jan. 10, 1928 |
| 1,948,494 | Ewald | Feb. 27, 1934 |
| 2,095,991 | Lysholm | Oct. 19, 1937 |
| 2,136,959 | Winfield | Nov. 15, 1938 |
| 2,219,994 | Jung | Oct. 29, 1940 |
| 2,223,381 | Mock | Dec. 3, 1940 |
| 2,245,562 | Becker | June 17, 1941 |
| 2,255,179 | McIntosh | Sept. 9, 1941 |
| 2,306,953 | Jung | Dec. 29, 1942 |
| 2,356,557 | Anxionnaz | Aug. 22, 1944 |
| 2,372,393 | Ray | Mar. 27, 1945 |
| 2,379,455 | Prince | July 3, 1945 |
| 2,404,428 | Bradbury | July 23, 1946 |
| 2,405,888 | Holley | Aug. 13, 1946 |
| 2,411,895 | Poole | Dec. 3, 1946 |
| 2,422,808 | Stokes | June 24, 1947 |
| 2,424,035 | Ifield | July 15, 1947 |
| 2,424,304 | Cunningham | July 22, 1947 |
| 2,437,377 | Chandler | Mar. 9, 1948 |
| 2,442,049 | Lee | May 25, 1948 |
| 2,442,463 | Lee | June 1, 1948 |
| 2,447,263 | Mock | Aug. 17, 1948 |
| 2,450,535 | Watson et al. | Oct. 5, 1948 |
| 2,456,603 | Barfod | Dec. 14, 1948 |
| 2,469,678 | Wyman | May 10, 1949 |
| 2,499,232 | Strub | Feb. 28, 1950 |
| 2,531,780 | Mock | Nov. 28, 1950 |
| 2,537,772 | Lundquist | Jan. 9, 1951 |
| 2,550,678 | Deacon | May 1, 1951 |
| 2,566,319 | Deacon | Sept. 4, 1951 |

FOREIGN PATENTS

| Number | Country | Date |
|---|---|---|
| 490,978 | Great Britain | Aug. 24, 1938 |
| 587,565 | Great Britain | Apr. 30, 1947 |